United States Patent [19]

Mair

[11] Patent Number: 4,810,402

[45] Date of Patent: Mar. 7, 1989

[54] SOLID MATERIAL FOR PRODUCING HEXAGONAL FERRITES

[75] Inventor: Gunther Mair, Mannheim, Fed. Rep. of Germany

[73] Assignee: BASF Aktiengesellschaft, Ludwigshafen, Fed. Rep. of Germany

[21] Appl. No.: 186,144

[22] Filed: Apr. 26, 1988

Related U.S. Application Data

[62] Division of Ser. No. 143,189, Jan. 13, 1988.

[30] Foreign Application Priority Data

Jan. 24, 1987 [DE] Fed. Rep. of Germany ....... 3702036

[51] Int. Cl.$^4$ ............................................. C04B 35/26
[52] U.S. Cl. ............................ 252/62.58; 252/62.59; 252/62.6; 252/62.62; 252/62.63; 423/277; 423/594; 423/397; 423/419 P; 556/31

[58] Field of Search ................. 252/62.58, 62.59, 62.6, 252/62.62, 62.63; 423/594, 419 P, 277, 395, 397; 556/31

[56] References Cited

U.S. PATENT DOCUMENTS

| | | | |
|---|---|---|---|
| 4,087,511 | 5/1978 | Ropp | 423/277 |
| 4,120,807 | 10/1978 | Watanabe et al. | 252/62.63 |
| 4,259,197 | 3/1981 | Boeuf et al. | 252/62.63 |
| 4,353,884 | 10/1982 | Wolf | 423/277 |
| 4,414,124 | 11/1983 | Endo et al. | 252/62.63 |
| 4,441,807 | 10/1983 | Watanabe et al. | 252/62.63 |
| 4,499,061 | 2/1985 | Glass | 423/277 |

*Primary Examiner*—Jack Cooper
*Attorney, Agent, or Firm*—Keil & Weinkauf

[57] ABSTRACT

A solid material useful for producing hexagonal ferrites comprises a homogeneous mixture of the cations of the composition (I) and one or more anions comprising one or more thermally decomposable anions.

6 Claims, No Drawings

SOLID MATERIAL FOR PRODUCING HEXAGONAL FERRITES

This is a division of application Ser. No. 143,189, filed Jan. 13, 1988.

The present invention relates to a solid material for producing hexagonal ferrites, comprising a homogeneous mixture of the cations of the composition (I) and one or more anions comprising one or more thermally decomposable anions, to processes for preparing this solid material, and to a method of using it for producing hexagonal ferrites.

The production of hexagonal ferrites, in particular substituted ferrites of the barium, strontium or lead ferrite type, is known. It is customarily effected by the ceramic process. This process usually comprises mixing barium carbonate or strontium carbonate, iron oxide and compounds of the other elements in the ratio conforming to the chemical formula of the later ferrite and sintering this mixture at up to 1300° C. The resulting product is then ground into a powder, usually in the presence of water. However, this method of working up causes substantial broadening of the particle size spectrum, which has a not inconsiderable adverse effect on the magnetic properties, in particular the uniformity of the switching field strength.

To produce the ferrites mentioned it is also possible to use flux processes where fluxes are used for promoting the reaction between the individual metal oxides, examples being alkali metal halides and sulfates. For instance, in U.S. Pat. No. 3,793,443 barium ferrite is prepared by heating a $BaCO_3$-FeOOH-NaCl-KCl mixture. A similar technique is adopted in U.S. Pat. No. 4,401,643 where, to prepare barium ferrite, the soluble chlorides of the metal components are precipitated with sodium carbonate and, after drying, sintered in the presence of the resulting sodium chloride.

In these alkali metal chloride and alkali metal sulfate flux processes, salt-ferrite mixtures are obtained in the form of compact, solid and hard melt cakes, the salt content of which is subsequently dissolved by slurrying in water to isolate the ferrite. A disadvantage of these processes is in some instances the high melt temperature. In addition, the resulting ferrite particles are frequently very coarse, having specific surface areas below 20 m²/g.

Ferrites are obtained in a similar manner by the glass process. To this end, oxides of the ferrite-forming metals are melted together with a glass-forming substance, for example borates, phosphates or silicates, the melt is then quenched to give a substantially noncrystalline glass, the glass material is then heat-treated to form a ferritic phase, and finally the glass substance is dissolved, for example with a weak acid, to leave behind the ferrite particles (inter alia DE-A-2,026,736, U.S. Pat. No. 4,569,775, EP-A-136,599). However, these processes have the disadvantage that they are technically very complicated and require very high temperatures to melt the oxides.

It is an object of the present invention to provide hexagonal ferrites which, as well as having a coercive force easily adjustable via type and degree of substitution, are distinguished by a simultaneously high saturation magnetization and small particle size. It is a further object of the present invention to describe a process whereby substituted hexagonal ferrites having the stated properties can be obtained.

We have found that these objects are achieved and that the hexagonal ferrites having the required properties are obtainable with a solid material comprising a homogeneous mixture of the cations in the composition (I)

$$M^{2+}[Fe_{(12-2x/3-py/3)}(Me^{2+})_x(Ma^{p+})_y]_m[(M^{2+})_zB]_n \qquad (I)$$

where
M = Ba, Sr, Pb
Me = Co, Zn, Ni, Mn, Cu
Ma = Ti, Zr, Hf, Ge, V, Nb, In
p = 3, 4, 5
x = 0–3
y = 0–3
z = 0.2–3
m = 0.7–1.5
n = 0.04–10 and one or more anions comprising one or more thermally decomposable anions.

We have further found processes for preparing this solid material and a method of using it for producing the hexagonal ferrites.

These processes for preparing the solid material comprise first dissolving the soluble salts, in the composition required for the proposed hexagonal ferrite, and an additional amount of the $M^{2+}$ cation, in general barium ions, in water and precipitating them by means of a base, for example NaOH and/or $Na_2CO_3$, and the precipitate is then separated off, washed and finally dispersed in a solution of boric acid. The water is removed from the dispersion, for example by spray drying. The resulting solid material according to the invention consists of agglomerated particles and, in addition to the thermally decomposable anions, contains all the constituents of the proposed hexagonal ferrite together with an M-borate glass component.

On stirring this solid material at from 400° to 900° C., in particular at from 600° to 800° C., the desired ferrite particles form in an amorphous glass matrix. Dissolving the glass matrix by means of weak acids, eg. acetic acid, as customary in the known glass process, the ferrite particles are freed and can be separated off by filtration.

In a further advantageous process for preparing the solid material, it is possible to use the customary salts of the designated cations Fe, M, Me and Ma. Suitable, for instance, for this purpose are in particular the nitrates, formates and acetates, which are used either alone or in mixtures of the various elements of the group, with or without corresponding halides, or even oxides, hydroxides and carbonates.

If titanium is used as a constituent of the solid material, it can be advantageous to use titanium tetrachloride in concentrations below 50% by volume, in general from 10 to 30% by volume. The boron component used is customarily boric acid, but it is also possible to use other boron components, for example borax.

The solid material according to the invention is a simply and inexpensively obtainable starting material for producing hexagonal ferrites of preselectable coercive force, via appropriate substitution in the solid material, a low and in particular uniform particle size below 0.3 μm and, owing to the high crystallinity, high saturation magnetization. A further advantage of the solid material according to the invention is that these ferrites are obtainable therefrom without costly process steps. These ferrites are advantageously usable as magnetic materials in the production of magnetic recording media, magnetic inks or toners in reproduction technology, and as absorbers of electromagnetic radiation in microwave technology.

The magnetic values of the materials were measured in a vibrating sample magnetometer at a field strength of 380 kA/m, specifically the coercive force $H_c$ in [kA/m] and both the specific remanent magnetization $M_{r/e}$ and the specific saturation magnetization $M_{m/e}$ in [nTm$^3$/g]. The DET specific surface area was determined in accordance with German Standard Specification DIN 66,132 by means of a Ströhlein areameter from Ströhlein, Düsseldor, West Germany, using the one-point difference method of Haul and Dümbgen.

EXAMPLE 1

44.75 g of NaOH and 81.94 g of Na$_2$CO$_3 \times$ 10 H$_2$O are dissolved at 40° C. in 1000 ml of water under nitrogen. A solution of 49.91 g of Ba(NO$_3$)$_2$, 6.96 g of Co(NO$_3$)$_2 \times$ 6 H$_2$O, 125.52 g of Fe(NO$_3$)$_3 \times$ 9 H$_2$O and 2.6 ml of TiCl$_4$ in 50 ml of isopropanol in 800 ml of water is then added at 40° C. with vigorous stirring in the course of 30 minutes. The pH is adjusted to 10 with HNO$_3$/NaOH. Cooling down is followed by filtering. The residue is washed three times with 300 ml of water each time and dispersed at 80° C. with 250 ml of water and 15.33 g of H$_3$BO$_3$. The suspension is dried and heat-treated at 750° C. for 6 hours, the glass content is then dissolved in acetic acid, and the ferrite isolated.

The measured results are:
$M_{m/e}$=60 nTm3/g,
$H_c$=43 kA/m,
$M_r/M_m$=0.54,
BET=24.4 m$^2$/g.

COMPARATIVE TEST 1

Example 1 is repeated without, however, the (BaO)$_{1.3} \times$ B$_2$O$_3$ glass content. The measured results are:
BET=0.7 m$^2$/g
$M_{m/e}$=28 nTm$^3$/g
$H_c$=54 kA/m

EXAMPLE 2

50.0 g of Ba(NO$_3$)$_2$, 6.13 g of Co(NO$_3$)$_2 \times$ 6 H$_2$O, 128.81 g of Fe(NO$_3$)$_3 \times$ 9 H$_2$O, 2.33 ml of TiCl$_4$ in 30 ml of isopropanol, and 15.33 g of H$_3$BO$_3$ are dissolved in 1500 ml of H$_2$O (corresponds to x, y=0.7) and spray-dried. The produce is heat-treated at 750° C. for 6 h. After cooling down, the glass component is dissolved by means of hot acetic acid, and the isolated ferrite is washed with acetic acid and H$_2$O. The physical values are:
$M_{m/e}$=59 nTm$^3$/g,
$H_c$=85 kA/m,
$M_r/M_m$=0.69,
BET=27.4 m$^2$g.

EXAMPLE 3

65.3 g of Ba(NO$_3$)$_2$, 9.31 g of Co(NO$_3$)$_2 \times$ 6 H$_2$O, 168.06 g of Fe(NO$_3$)$_2 \times$ 9 H$_2$O, 3.5 ml of TiCl$_4$ in 35 ml of isopropanol and 18.2 g of H$_b$BO$_3$ are dissolved in 2000 ml of H$_2$O (x, y=0.8), the solution is spray-dried, and the product is heat-treated at 750° C. for 2 h. Further treatment is carried out as in Example 2.
$M_{m/e}$=47 nTm$^3$/g,
$H_c$=58 kA/m,
$M_r/M_m$=0.63,
BET=27.8 m$^2$/g

EXAMPLE 4

65.3 g of Ba(NO$_3$)$_2$, 9.31 g of Co(NO$_3$)$_2 \times$ 6 H$_2$O, 168.06 g of Fe(NO$_3$)$_3 \times$ 9 H$_2$O, 3.5 ml of TiCl$_4$ in 35 ml of isopropanol and 15.6 g of H$_3$BO$_3$ are dissolved in 2000 ml of H$_2$O (x, y=0.8) and further treatment is carried out as in Example 3.
$M_{m/e}$=48 nTm$^3$/g,
$H_c$=76 kA/m,
$M_r/M_m$=0.66,
BET=29.4 m/g

EXAMPLE 5

386.2 g of Fe(NO$_3$)$_3 \times$ 9 H$_2$O are dissolved in H$_2$O, precipitated with NH$_3$, washed with H$_2$O and dissolved at 80° C. in 419 g of citric acid in 1.3 l of H$_2$O. To this are added 113.11 g of BaCO$_3$, 15.74 g of Co(CH$_3$COO)$_2 \times$ 4 H$_2$O, 7 ml of TiCl$_4$ in 25 ml of isopropanol and 45.98 g of H$_3$BO$_3$ and stirred in until all the components are completely dissolved. 112 ml of ethyl alcohol are then added, and the solution is spray-dried. The product is heat-treated at 750° C. for 6 hours and further treated as in Example 1.
$M_{m/e}$=42 nTm$^3$/g,
$H_c$=50 kA/m, $M_r/M_m$=0.42,
BET=30.1 m$^2$/g.

I claim:

1. A solid material of agglomerated particles comprising a homogeneous mixture of the cations of the formula

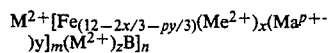

where
M=Ba, Sr, Pb
Me=Co, Zn, Ni, Mn, Cu
Ma=Ti, Zr, Hf, Ge, V, Nb, In
p=3, 4, 5
x=0-3
y=0-3
z=0.2-3
m=0.7-1.5
n=0.04-10 and at least one anion component comprising at least one thermally decomposable anion, for producing hexagonal ferrite particles having a size below 0.3 μl prepared by a method comprising
dissolving soluble salts of the metal components of the ferrite in water,
precipitating said components with a base,
separating off and washing the precipitate,
dispersing the washed precipitate inn an aqueous solution of boric acid or borax, and
drying the resulting dispersion to form said solid material of agglomerated particles.

2. The solid material of claim 1 which contains as the anion component at least one anion selected from the group consisting of the hydroxides, carbonates, nitrates, formates and acetates.

3. The solid material as in claim 1 which contains as the anion component at least one anion selected from the group consisting of the hydroxides, carbonates,, nitrates, formates and acetates and additionally at least one anion selected from the group consisting of the halides.

4. A solid material of agglomerated particles comprising a homogeneous mixture of the cations of the formula $$M^{2+}[Fe_{(12-2x/3-py/3)}(Me^{2+})_x(Ma^{p+})_y]_m(M^{2+})_zB]_n$$

where
M = Ba, Sr, Pb
Me = Co, Zn, Ni, Mn, Cu
Ma = Ti, Zr, Hf, Ge, V, Nb, In
p = 3, 4, 5
x = 0-3
y = 0-3
z = 0.2-3
m = 0.7-1.5
n = 0.04-10 and at least one anion component comprising at least one thermally decomposable anion, for producing hexagonal ferrite particles having a size below 0.3 μm prepared by dissolving soluble salts of the metal components of the ferrite together with boric acid or borax in water, and drying the resultant aqueous mixture to form said solid material of agglomerated particles.

5. The solid material of claim 4 which contains as the anion component at least one anion selected from the group consisting of the hydroxides, carbonates, nitrates, formates and acetates.

6. The solid material as in claim 4 which contains as the anion component at least one anion selected from the group consisting of the hydroxides, carbonates, nitrates, formates and acetates and additionally at least one anion selected from the group consisting of the halides.

* * * * *

UNITED STATES PATENT AND TRADEMARK OFFICE
CERTIFICATE OF CORRECTION

PATENT NO. : 4,810,402

DATED : March 7, 1989

INVENTOR(S) : MAIR

It is certified that error appears in the above-identified patent and that said Letters Patent is hereby corrected as shown below:

IN THE CLAIMS

Claim 1, Line 48

"below 0.3ul"

Should be:

"below 0.3um"

Claim 1, Line 55

"precipitate inn"

Should Be:

"precipitate in"

Signed and Sealed this

Fourteenth Day of November, 1989

Attest:

JEFFREY M. SAMUELS

Attesting Officer     Acting Commissioner of Patents and Trademarks